Figure 1:
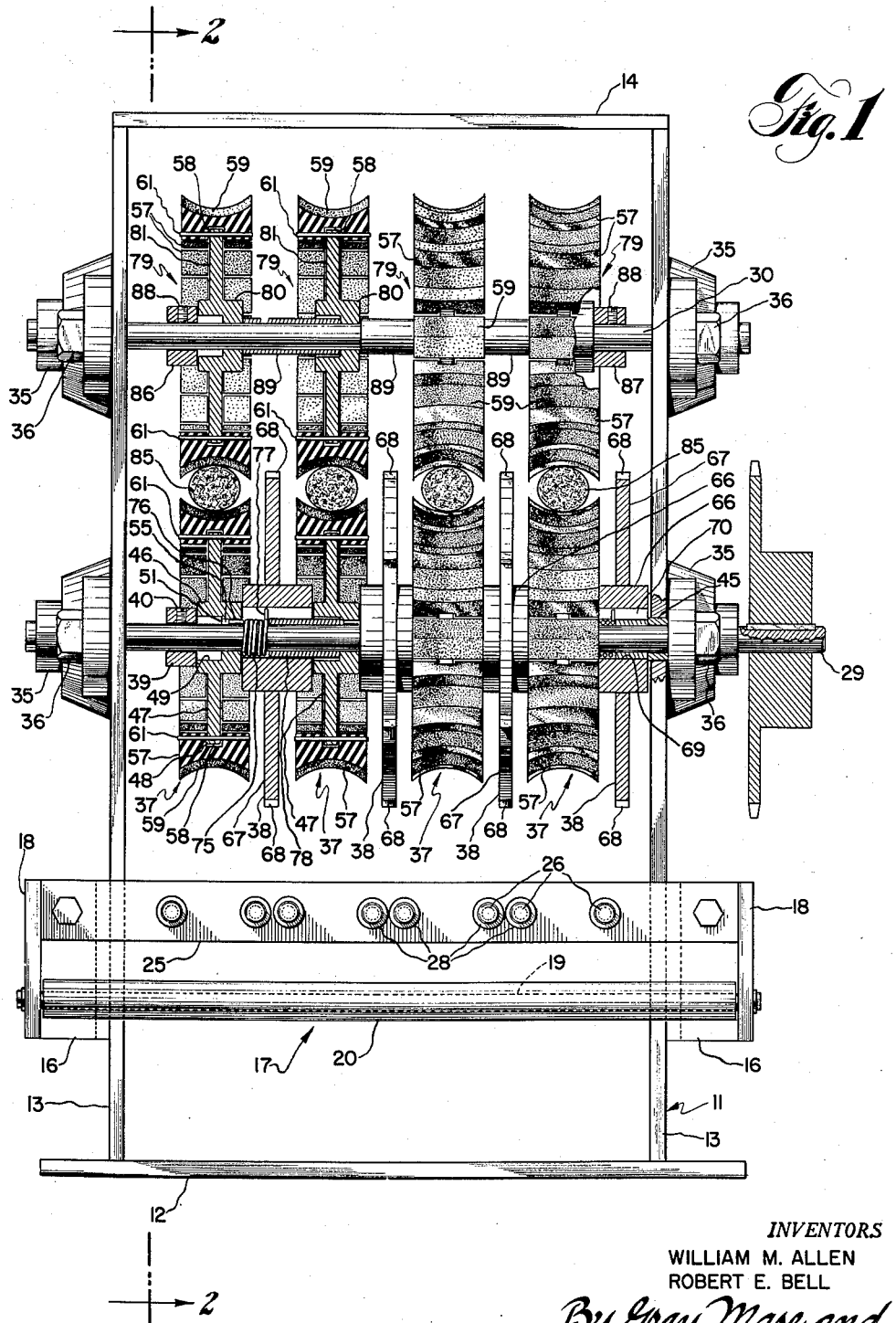

April 24, 1962 W. M. ALLEN ET AL 3,031,119
APPARATUS FOR FEEDING CYLINDRICAL MATERIAL
Filed May 13, 1960 3 Sheets-Sheet 1

INVENTORS
WILLIAM M. ALLEN
ROBERT E. BELL
By Gray, Mase and
Dunson, Attorneys

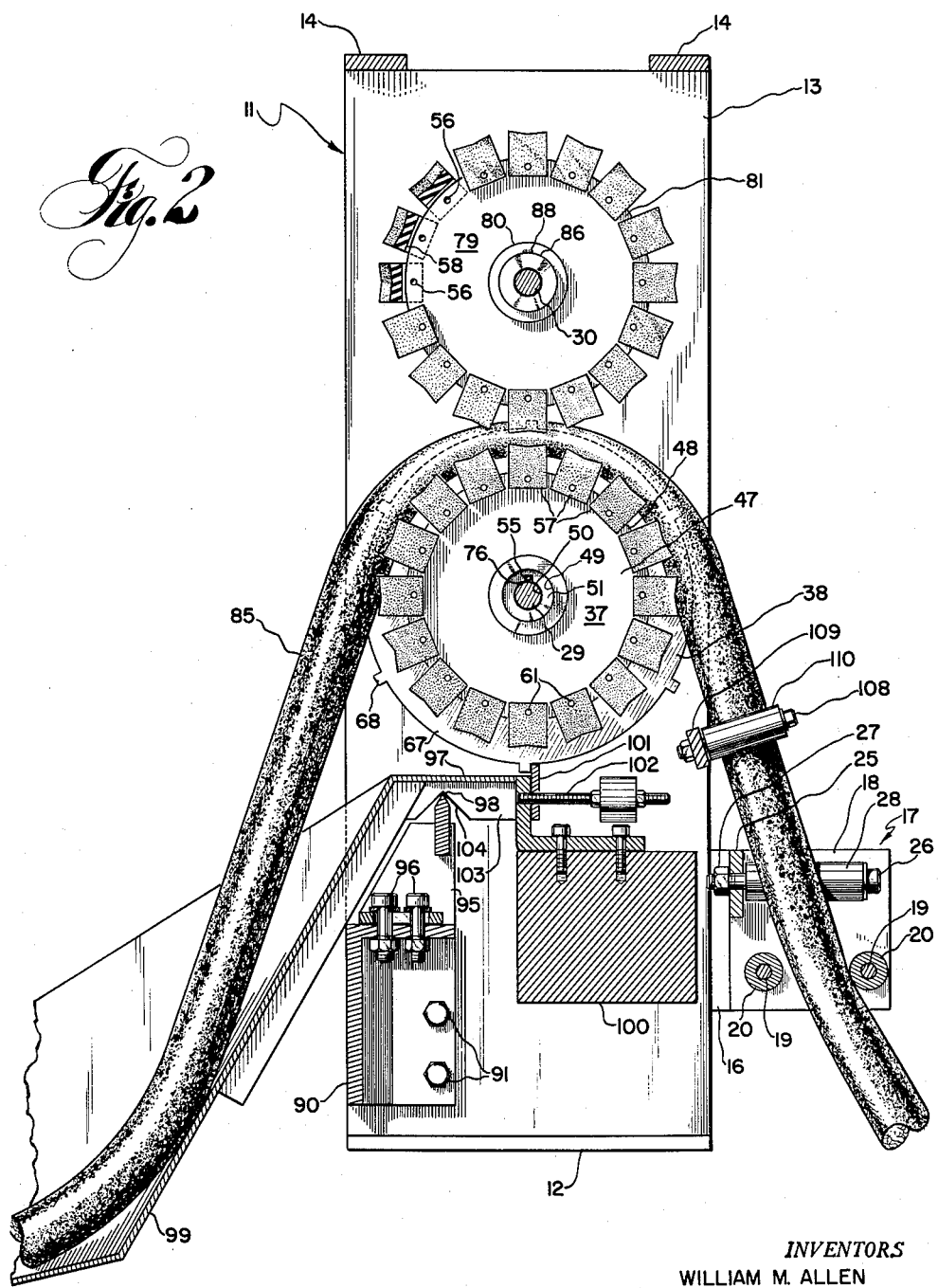

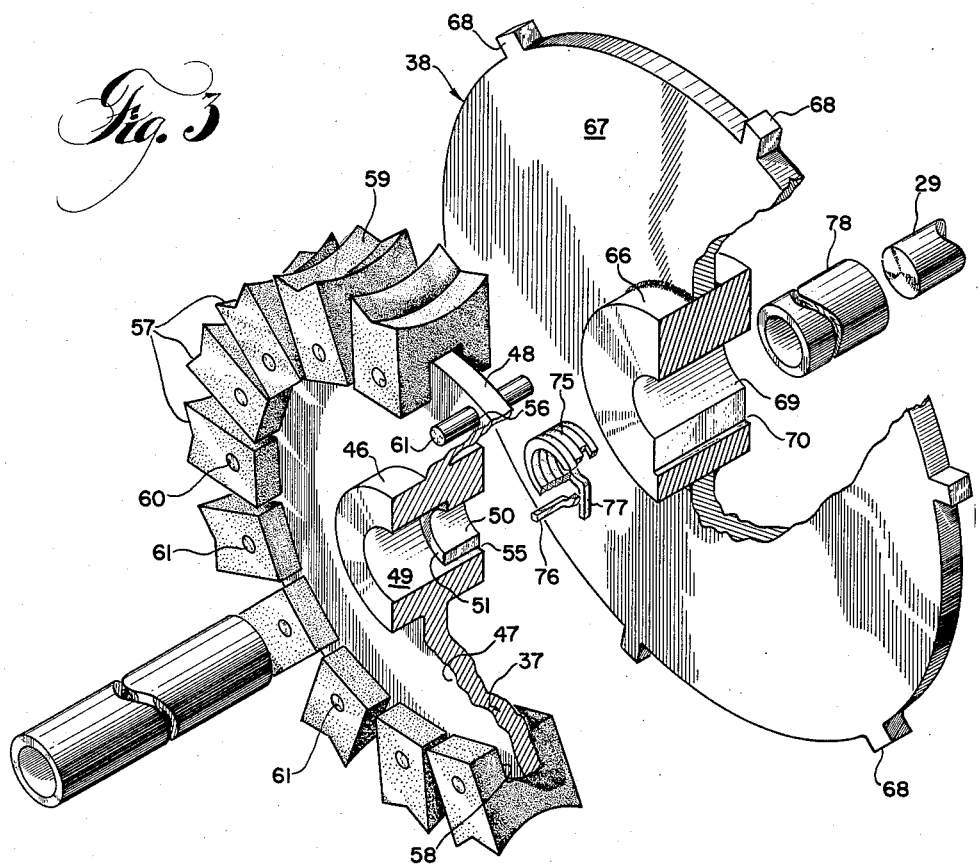

3,031,119
APPARATUS FOR FEEDING CYLINDRICAL MATERIAL
William M. Allen and Robert E. Bell, Columbus, Ohio, assignors, by mesne assignments, to Frank Research Corporation, Canton, Ohio, a corporation of Ohio
Filed May 13, 1960, Ser. No. 28,992
6 Claims. (Cl. 226—43)

This invention relates to apparatus for feeding cylindrical material. More particularly, it is concerned with apparatus for supplying cylindrical material on demand, automatically and at a substantially constant tension.

In the manufacture of a variety of products from a long length of cylindrical material or flexible rod like shapes, it is often necessary to supply the cylindrical material to a processing machine where the material may have a number of further operations performed such as cutting, cooking, and packaging. The cylindrical material which is in the uncooked or soft stage is usually easily broken, twisted, or stretched, so that it is difficult to maintain a constant supply and shape of the cylindrical material. This is especially true in candy making, dough processing, and sausage making. For example, in the manufacture of skinless sausages or frankfurters, a comminuted meat mixture is stuffed into a long length of a suitable sausage casing, that is formed of cellulose film or similar material. The cylindrical material or sausage-filled casing is then supplied to a machine for dividing the long length of cylindrical material into a plurality of individual sausages of uniform length, generally by constricting a small section of the casing at suitable intervals, and these are then smoked, cooked, cooled, and subjected to the treatment necessary to prepare the product for market. The usual method of supplying the long lengths of cylindrical material to the machine is by hand. The cylindrical material is placed upon a table. An operator is usually present to remove loops and tangles as the material is pulled from the table into the processing machine. Even though an operator is present, it is extremely difficult to maintain a uniform tension on the material due to the operator's preoccupation with straightening and handling the material and, in addition, as the material is used up, the length of the material, and consequently the weight, resisting the pull of the processing machine, is constantly changing. If production time and costs are to be minimized, it is also much better to feed a number of strands or lengths of cylindrical material simultaneously to the processing machine. The apparatus of this invention solves the problems previously described by feeding the material to a receiver, such as a processing machine, at a constant tension. While the material is made available continuously and at a constant tension for a processing machine, the apparatus of this invention removes the material from the supply area or table intermittently, thus allowing an operator to become accustomed to intermittent, timed movement. This enables the operator to handle the cylindrical material in a nonmoving state.

Briefly described, the apparatus of this invention comprises guide means for supplying cylindrical material to a receiver, means to detect the presence of a predetermined length of the cylindrical material, means to stop said guide means from supplying additional material after detecting the predetermined length of the cylindrical material and to start said guide means after the predetermined amount of material is used by the receiver.

One advantage of the apparatus of this invention is that it is especially suited for feeding cylindrical material at a substantially uniform tension to a receiver so as to minimize twisting, tearing, or deforming the material.

Another advantage of the apparatus of this invention is that cylindrical material is supplied automatically at substantially constant tension according to the demand of the receiver.

Still another advantage of this invention is that a plurality of lengths of cylindrical material may be fed simultaneously at substantially uniform tension, even though the demand of the recipients of each length of cylindrical material may vary and require different and changing feed rates on each length of cylindrical material.

In the drawings:
FIG. 1 is a partially sectional elevational view of the feeding apparatus;
FIG. 2 is a sectional elevational view of the feeding apparatus taken along the line 2—2 of FIG. 1; and
FIG. 3 is an exploded view of the drive shaft, brake wheel, and clutch mechanism which is a part of the feeding apparatus.

Referring to FIGS. 1 and 2, a frame 11 has a base plate 12, a pair of side plates 13—13 and cross members 14—14. Affixed to each side plate 13 is a support member 16 which supports a guide roller assembly 17 comprised of end plates 18—18 that support a pair of rods 19—19 upon which are rotatably mounted transverse rollers 20—20 and comprised of cross member 25 to which is attached a plurality of pins 26—26 by suitable means such as nuts 27—27, each pin having a roller 28 rotatably mounted thereon. Each set of guide rollers 20—20 and 28—28 has its longitudinal axis parallel to each other and spaced apart at a distance about the diameter of the cylindrical material to be fed through the apparatus.

A drive shaft 29 and an idler shaft 30 extend between and through the side plates 13—13 and are rotatably mounted by suitable means, such as bearings 35—35 attached to the side plates 13—13 by bolts 36—36. A plurality of driven or feeder wheels 37—37 is mounted on drive shaft 29 and associated with each feeder wheel is a brake wheel 38 also mounted on drive shaft 29. Feeder wheels 37—37 and brake wheels 38—38 are positioned on the drive shaft 29 by a locating collar 39 affixed to the drive shaft 29 by means of a set screw 40 and a second locating collar 45 at the opposite end of the shaft 29 which bears against the side of brake wheel 38 and the bearing 35.

As shown in FIGS. 1 and 3, the feeder wheel 37 is comprised of a hub 46 supporting a disk 47 having an outer periphery 48 and is provided with two centrally located bores 49 and 50 for receiving the shaft 29. Bore 50 is provided with a recess 55 with its length parallel to the longitudinal axis of the bores 49 and 50. The outer periphery 48 of the disk 47 is provided with a plurality of perforations 56 for mounting a plurality of teeth 57—57. Each tooth 57 is provided with a notch 58 to fit over the periphery 48 of the wheel 37 and on the opposite side with a concave surface 59 shaped to fit a half cylinder having a diameter of about the same as the cylindrical material to be fed through the feeder. A hole 60 is provided on each side of the tooth 57 to receive a pin 61 which passes through the hole 60 in the tooth 57 and the hole 56 in the outer periphery 48 of the wheel 37. The teeth 57—57 are preferably formed from a somewhat pliable material such as rubber.

The brake wheel 38 is comprised of a hub 66 supporting a disk 67 whose outer periphery is provided with a plurality of lugs 68. Brake wheel 38 is further provided with a centrally located bore 69 communicating with a slot 70 that extends radially from the center of the bore 69.

A spirally wound clutch spring 75 is provided with an inside diameter slightly smaller than shaft 29 and fits inside the bore 69 and around the drive shaft 29. Clutch spring 75 is provided with one horizontal end 76 that is parallel to the longitudinal axis of the shaft 29 and a vertical end 77 that is perpendicular to the longitudinal axis of the shaft 29.

When the feeder wheels 37—37 and brake wheels 38—38 are assembled on the shaft 29, the side of the hub 46 of feeder wheel 37 that is provided with the bore 49 fits against the locating collar 39. The clutch spring 75 is fitted inside the bore 69 of the brake wheel 38 so that the end projection 77 fits into the slot 70. The clutch spring 75 and brake wheel 38 are then slipped onto the shaft and the horizontal projection 76 of the clutch spring 75 is fitted into the recess 55 of the feeder wheel 37. A spacer tube 78 is fitted over the drive shaft 29 into the bore 69 of the brake wheel 38 and against the vertical projection 77 of the clutch spring. The spacer tube 78 ensures engagement of the clutch spring 75 with the recess 55 of the feeder wheel 37. The spacer tube 78 is of sufficient length to bear against the shoulder 51 between bores 49 and 50 of the next feeder wheel 37. The provision of the spacer tube 78 between sets of feeder-brake wheel combinations positions the wheels on the drive shaft 29 and maintains the wheels a slight distance apart so that the hubs of the wheels do not rub against one another.

Idler shaft 30 is provided with a plurality of idler wheels 79 rotatably mounted on idler shaft 30 with one idler wheel 79 positioned directly opposite each feeder wheel 37. The feeder wheel 37 and idler wheel 79 comprises a guide means for the cylindrical material. Each idler wheel 79 is provided with a hub 80 a circular disk 81 on whose periphery is mounted a plurality of teeth 57—57. The teeth 57—57 on each idler wheel 79 are spaced from the teeth 57—57 on each feeder wheel 37 so that the cylindrical material 85 contacts the teeth 57—57 of each wheel and is substantially contained between the teeth 57—57 of each wheel. Locating collars 86 and 87 are provided on the idler shaft 30 and are affixed thereto by means of set screws 88. The locating collars 86 and 87 along with spacer tubes 89 position and space the idler wheels 79—79 on the idler shaft 30.

Mounted between the sides 13—13 of the feeder frame 11 opposite the guide roller assembly is a tray support frame 90 and affixed to the sides 13—13 by suitable means such as bolts 91. A tray support 95 is attached to the tray support frame 90 by bolts 96. A balance arm 97 is pivotally mounted on a knife edge 98 attached to the tray support 95. Attached to the balance arm 97 on one side of the knife edge 98 is an elongated collector or control tray 99 for receiving the cylindrical material 85. Attached to the balance arm 97 on the opposite side of the knife edge 98 is a counterweight 100, a brake plate 101 and a fine balance adjusting screw 102. The balance arm 97 is provided with a plate 103 having a notch 104 that mates with the knife edge 98. Each balance arm 97 with its attached parts comprises a control means to stop and release each brake wheel 38.

The cylindrical material 86 is ensured of being aligned for introduction between the opposing pairs of feeder wheels 37—37 and idler wheels 79—79 by a plurality of guide pins 108—108 mounted on cross bar 109 and positioned to contact the cylindrical material just before it passes between the wheels. The bar 109 is affixed between the side plates 13—13. (Shown in FIG. 2, but omitted in FIG. 1 for clarity.)

*Operation*

The feeding apparatus is threaded by passing the cylindrical material between the rollers 20—20 and 28—28, guide pins 108, and between the guide means, that is, a feeder wheel 37 and an oppositely disposed idler wheel 79. When drive shaft 29 is rotated, the feeder wheel 37 and brake wheel 38 are also rotated. Rotation of feeder wheel 37 causes the cylindrical material to be pulled between the feeder wheel 37 and idler wheel 79. Idler wheel 79 is also free to rotate as the cylindrical material moves with the teeth 57—57 attached to the idler wheel 79. The cylindrical material is fed from between the feeder wheel and idler wheel 79 on the opposite side of the machine into a control tray 99. From the control tray 99 the cylindrical material 85 passes to the receiver or processing machine. The drive shaft 29 is rotated at a sufficient speed so that the discharge rate is faster than the demand of the receiver or processing machine. Since the discharge rate is faster than the rate of demand, the cylindrical material 85 will eventually accumulate in a control tray. When the cylindrical material 85 accumulates in a control tray, the weight of the cylindrical material 85 overbalances the weight of the counterweight 100 so that the balance arm 97 pivots on the knife edge 98 and the brake plate engages one of the lugs 68 on the periphery of the brake wheel 38. The clutch spring 75 grips or frictionally engages the drive shaft 29 so that projection 76 fits into the recess 55 engaging and driving the feeder wheel 37. Projection 77 fits into the slot 70, engaging and driving the brake wheel 38. When the brake wheel 38 is stopped by engagement between the knife edge 98 and one of the lugs 68, the spring coil or clutch spring 75 is opened, slightly reducing the grip or friction engagement of the spring 75 on the shaft 29 thus causing the spring 75 and consequently the feeder wheel 37 to stop rotating. The particular feeder wheel 37 which is controlled by the particular control tray 99 that is filled with cylindrical material 85 is thus prevented from feeding further cylindrical material 85 until the recipient or processing machine uses the cylindrical material in the control tray 99 so that the counterweight pivots the balance arm 97 on the knife edge 98 disengaging the brake plate 106 from engagement with the lug 68 on the brake wheel 38. When the brake plate 106 is disengaged from the lug 68, the clutch spring 75, due to its resilience, tightens and grips the drive shaft 29 again, rotating the feeder wheel 37, and feeding the cylindrical material 85 into the control tray 99 again. It will thus be seen that a plurality of feeder wheel 37 and brake wheel 38 combinations may operate independent of other feeder wheel 37 and brake wheel 38 combinations, since the rotation of each feeder wheel depends upon the overriding action of its associated control tray 99 and brake wheel 38.

It will be understood, of course, that, while the forms of the invention herein shown and described constitute the preferred embodiment of the invention, it is not intended to illustrate all the possible forms of the invention. It will also be understood that the words used are words of description rather than words of limitation and that various changes, such as changes in shape, size, and arrangement of parts may be made without departing from the spirit of the scope of the invention herein disclosed.

What is claimed is:

1. Apparatus for automatically feeding lengths of cylindrical material to a receiver comprising: a drive shaft; a pair of wheels having their peripheries opposite one another positioned to feed said cylindrical material therebetween one of said pair of wheels being rotatably mounted on and frictionally engaged with said drive shaft; a brake wheel rotatably mounted on said drive shaft adjacent to said one of said pair of wheels mounted on said drive shaft; and means for engaging said brake wheel and thereby disengaging said one of said pair of wheels from said drive shaft after a predetermined length of said cylindrical material has been fed between said pair of wheels and for disengaging said brake wheel thereby re-engaging said one of said pair of wheels after a portion of said predetermined length of said cylindrical material has been used by said receiver.

2. Apparatus for automatically feeding lengths of cylindrical material to a receiver comprising: a frame; a first wheel rotatably mounted on a drive shaft supported by said frame; a second wheel rotatably mounted on an idler shaft supported by said frame and parallel to said drive shaft, the periphery of said second wheel being spaced from the periphery of said first wheel at a distance substantially equal to the diameter of said cylindrical material; a brake wheel adjacent said first wheel, rotatably mounted on said drive shaft, and having a plurality of lugs at spaced intervals on its outer periphery; and a balance arm having a collector on one end and a plate on the opposite end and pivotally supported by said frame, said collector positioned to receive said cylindrical material fed between said first and second wheels and said plate positioned to engage said lugs on said brake wheel, whereby said cylindrical material filling and being emptied from said collector pivots said balance arm engaging and disengaging said plate with said lugs to stop and start said first and second wheels as said cylindrical material is demanded by said receiver.

3. Apparatus for automatically feeding lengths of cylindrical material to a receiver comprising: a frame; a drive shaft supported by said frame; an idler shaft parallel to said drive shaft and supported by said frame; at least one feeder wheel rotatably mounted on said drive shaft; an idler wheel rotatably mounted on said idler shaft, opposing each said at least one feeder wheel, and spaced from said at least one feeder wheel to allow passage of said cylindrical material therebetween; a brake wheel rotatably mounted on said drive shaft adjacent each at least one feeder wheel; a clutch spring frictionally engaging said drive shaft, having a first projection engaging said brake wheel and a second projection engaging said at least one feeder wheel; and at least one control means responsive to the feeding of a predetermined length of said cylindrical material for contacting said brake wheel, said brake wheel thereby engaging and disengaging said clutch spring.

4. Apparatus for automatically feeding lengths of cylindrical material to a receiver comprising: a frame; a drive shaft supported by said frame; an idler shaft parallel to said drive shaft and supported by said frame; a plurality of feeder wheels rotatably mounted on said drive shaft; an idler wheel opposing each of said plurality of feeder wheels, rotatably mounted on said idler shaft, and spaced from said opposing feeder wheel to allow passage of said cylindrical material therebetween; a brake wheel adjacent each of said plurality of feeder wheels, rotatably mounted on said drive shaft, and having a plurality of lugs spaced on the outer periphery thereof; a clutch spring frictionally engaging said drive shaft, having a first projection engaging said brake wheel, and having a second projection engaging said adjacent feeder wheel; a balance arm pivotally supported by said frame, having a tray at one end positioned to receive said cylindrical material from each of said plurality of feeder wheels, and a brake plate at the opposite end, said brake plate pivoted into engagement with one of said lugs on said brake wheel upon filling said control tray with a predetermined length of said cylindrical material, whereby said brake wheel is stopped rotating and the inertia of said adjacent feeder wheel uncoils and disengages said clutch spring from said drive shaft until said predetermined length of said cylindrical material in said control tray is removed therefrom and said balance arm pivots to disengage said brake plate from said lug on said brake wheel allowing said clutch spring to re-engage said drive shaft.

5. Apparatus for automatically feeding lengths of cylindrical material to a receiver comprising: a frame; a drive shaft supported by said frame; an idler shaft parallel to said drive shaft and supported by said frame; a feeder wheel rotatably mounted on said drive shaft; an idler wheel rotatably mounted on said idler shaft, opposing said feeder wheel, and spaced from said feeder wheel to allow passage of said cylindrical material therebetween; a plurality of rollers supported by said frame positioned to guide said cylindrical material between said feeder wheel and said idler wheel; a brake wheel rotatably mounted on said drive shaft and having a plurality of lugs spaced on the outer periphery thereof; a clutch spring frictionally engaging said drive shaft, having a first projection engaging said brake wheel, and having a second projection engaging said feeder wheel; a balance arm pivotally supported by said frame, having a tray at one end positioned to receive said cylindrical material from said feeder wheel, and a brake plate at the opposite end, said brake plate pivoted into engagement with one of said lugs on said brake wheel upon filling of said control tray with a predetermined length of said cylindrical material, whereby said brake wheel is stopped from rotating and the inertia of said feeder wheel uncoils and disengages said clutch spring from said drive shaft until said predetermined length of said cylindrical material in said control tray is removed therefrom whereupon said balance arm pivots to disengage said brake plate from said lug on said brake wheel allowing said clutch spring to re-engage said drive shaft.

6. Apparatus for automatically feeding lengths of cylindrical material to a receiver, comprising: a drive shaft; a pair of wheels having their peripheries opposite one another positioned to feed said cylindrical material therebetween, one of said pair of wheels being rotatably mounted on and frictionally engaged with said drive shaft; and means for disengaging said one of said pair of wheels from said drive shaft after a predetermined length of material has passed between said wheels and for re-engaging said one of said pair of wheels with said drive shaft after said length of material has been used by said receiver.

References Cited in the file of this patent
UNITED STATES PATENTS

| | | |
|---|---|---|
| 2,212,947 | Myer et al. | Aug. 27, 1940 |
| 2,903,901 | MacDonald | Sept. 15, 1959 |